(12) United States Patent
Aitchison et al.

(10) Patent No.: US 8,773,841 B2
(45) Date of Patent: Jul. 8, 2014

(54) CHARGE STORAGE DEVICE

(75) Inventors: Phillip Brett Aitchison, New South Wales (AU); Alexander Bilyk, New South Wales (AU); John Chi Hung Nguyen, New South Wales (AU); Warren King, New South Wales (AU)

(73) Assignee: Cap-XX Limited, New South Wales (AU)

( * ) Notice: Subject to any disclaimer, the term of this patent is extended or adjusted under 35 U.S.C. 154(b) by 338 days.

(21) Appl. No.: 13/062,779

(22) PCT Filed: Sep. 9, 2009

(86) PCT No.: PCT/AU2009/001189
§ 371 (c)(1),
(2), (4) Date: Mar. 8, 2011

(87) PCT Pub. No.: WO2010/028439
PCT Pub. Date: Mar. 18, 2010

(65) Prior Publication Data
US 2011/0194231 A1 Aug. 11, 2011

(30) Foreign Application Priority Data
Sep. 9, 2008 (AU) .................................. 2008904683

(51) Int. Cl.
*H01G 9/02* (2006.01)
(52) U.S. Cl.
USPC ........................................ 361/502; 252/62.2
(58) Field of Classification Search
USPC ................... 361/502–503; 252/62.2
See application file for complete search history.

(56) References Cited

U.S. PATENT DOCUMENTS

| 5,973,913 A | 10/1999 | McEwen et al. |
| 6,879,482 B2 * | 4/2005 | Kawasato et al. ............. 361/502 |
| 2005/0158623 A1 | 7/2005 | Matsui et al. |
| 2007/0231702 A1 | 10/2007 | Fujita et al. |
| 2008/0057385 A1 | 3/2008 | Aramata et al. |
| 2008/0160415 A1 | 7/2008 | Wakita et al. |
| 2010/0046142 A1 | 2/2010 | Aitchison et al. |

FOREIGN PATENT DOCUMENTS

| CN | 101085762 A | 12/2007 |
| CN | 101131887 A | 2/2008 |
| CN | 101241774 A | 8/2008 |
| EP | 1365427 B1 | 11/2003 |
| EP | 1557899 A2 | 7/2005 |
| WO | 9908299 A1 | 2/1999 |
| WO | 0034964 A1 | 6/2000 |
| WO | 03079381 A1 | 9/2003 |

OTHER PUBLICATIONS

Chinese First Notification of Office Action, Application No. 200980144547.6, Dated May 9, 2012.

(Continued)

*Primary Examiner* — Eric Thomas
(74) *Attorney, Agent, or Firm* — MacMillan, Sobanski & Todd, LLC

(57) ABSTRACT

A supercapacitor capable of withstanding SMT manufacturing conditions includes at least one pair of electrodes having a mixture of carbon particles preferably in a CMC binder on facing surfaces of the at least one pair of electrodes; a porous separator, preferably polyimide, positioned between the facing surfaces of the at least one pair of electrodes; and an electrolyte for wetting the separator wherein the electrolyte includes an ionic liquid, such as EMITSFI, and optionally a solvent such as PC, GBL or glutaronitrile.

27 Claims, 9 Drawing Sheets

(56) References Cited

OTHER PUBLICATIONS

PCT International Search Report, PCT/AU2009/001189, Date of Completion Nov. 6, 2009.

Wang, Y. et al., "Research of Ionic Liquid Application for Electric Double-Layer Capacitor," Chinese Journal of Power Sources, Jul. 2005, vol. 29, No. 7, pp. 466-469, 481.

* cited by examiner

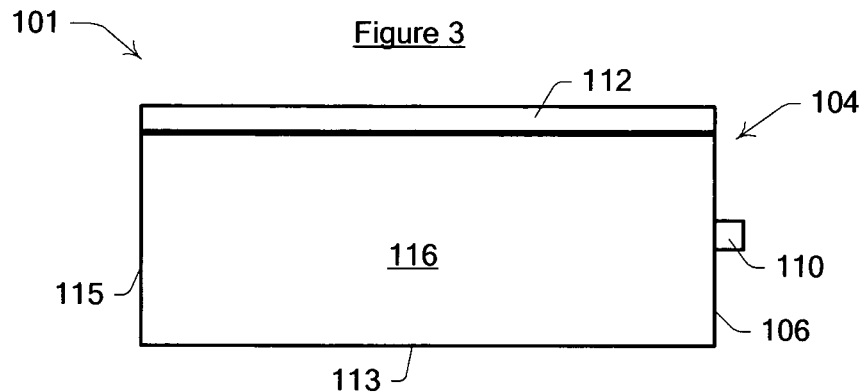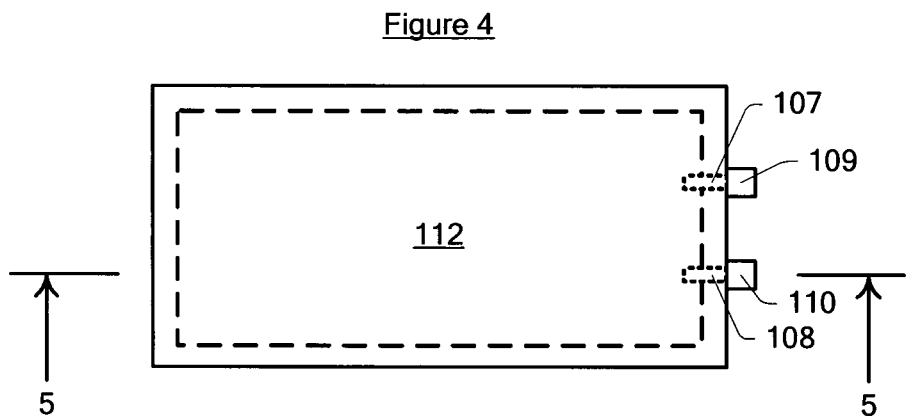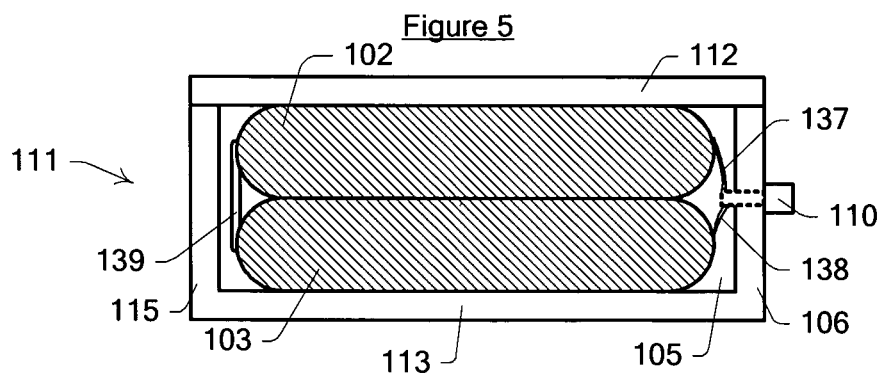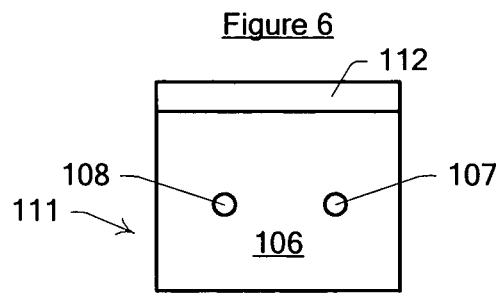

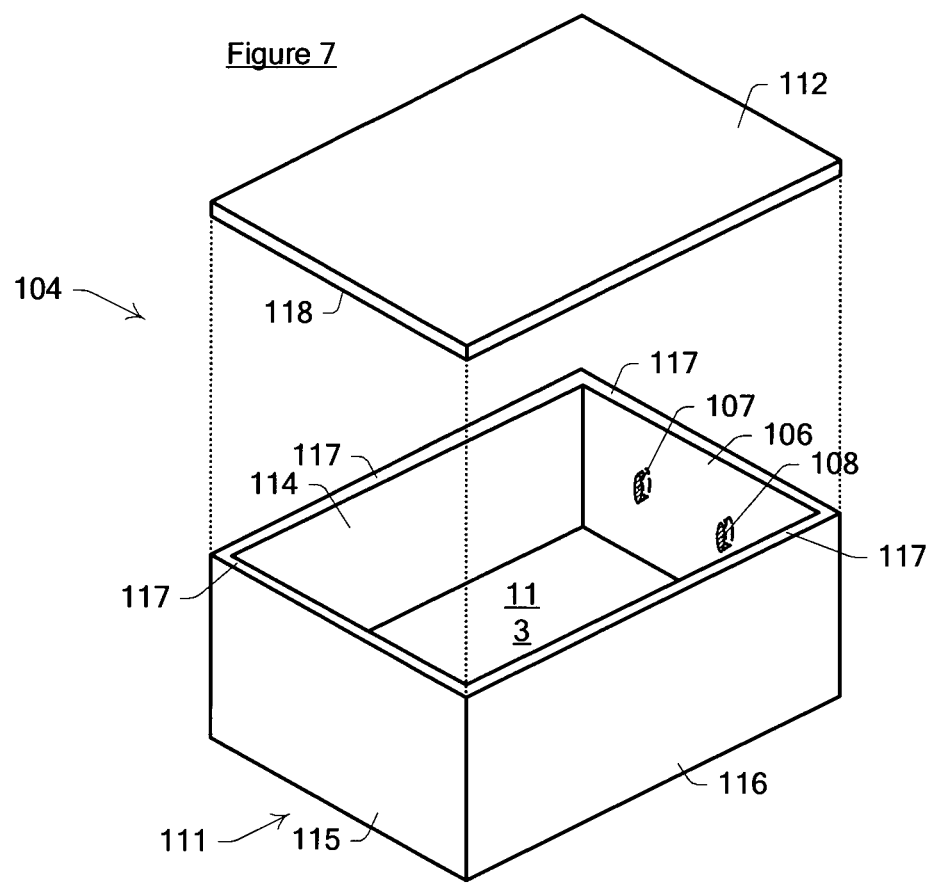

CHARGE STORAGE DEVICE

CROSS-REFERENCE TO RELATED APPLICATIONS

This application is the National Phase of International Application PCT/AU2009/001189 filed Sep. 9, 2009, which designated the U.S. That International Application was published in English under PCT Article 21(2) on Mar. 18, 2010 as International Publication Number WO 2010/028439A1. PCT/AU2009/001189 claims priority to Australian Application No. 2008904683 filed Sep. 9, 2008. Thus, the subject nonprovisional application also claims priority to Australian Application No. 2008904683 filed Sep. 9, 2008. The disclosures of both applications are incorporated herein by reference.

FIELD OF THE INVENTION

The present invention relates to energy storage devices. In particular, the invention relates to energy storage devices capable of withstanding thermal shock.

The invention has been developed primarily as a supercapacitor capable of withstanding thermal shock, such as encountered in electronics manufacturing using reflow processes and will be described hereinafter with reference to this application. It will be appreciated, however, that the invention is not limited to that particular field of use.

The disclosure of the present application also incorporates by reference the applicant's co-pending applications entitled "A Package For An Electrical Device", filed on the same date as the present application, application Ser. Nos. 13/062,785 and 13/062,801.

BACKGROUND OF THE INVENTION

Any discussion of the prior art throughout the specification should in no way be considered as an admission that such prior art is widely known or forms part of the common general knowledge in the field.

Supercapacitors store energy by means of separation of charge rather than by the electro-chemical process inherent in a battery.

Supercapacitors are also designated by terms such as ultra capacitors, electrochemical double layer capacitors (EDLC) and electrochemical capacitors, amongst others, all of which are included within the term "supercapacitor" as used within this specification.

Supercapacitors generally enable fast (high power) delivery of energy with the amount of energy delivered being very high compared to ordinary capacitors, but low compared to batteries. Low resistance, high energy density, small supercapacitors are ideally suited for high power applications such:

Wireless communications with limited power supplies such as: Mobile/cellular telephones; PC card; CF card; mini PCI; express card; USB modems; PDA's; automatic meter reading; toll tags; GPS, GPRS and RF tracking.

Energy back-up (UPS) in portable, or space constrained devices.

Voltage regulation for CPU's; automotive vehicles; portable audio and other devices with high surge loads.

High energy, high power electrical loads, such as: Actuators for door locks; DSC's and LED flash for cameras.

Solid state memory storage devices (eg. solid state hard drives).

Supercapacitors generally include two opposed electrodes electrically isolated by an intermediate electronically insulating separator which is porous and permeated by the electrolyte. Two current collecting terminals generally connect to and extend from respective electrodes for allowing external access to the electrodes. The housing is sealed to preventingress of contaminants and egress of electrolyte.

The energy storage capacity for a supercapacitor can be described by the equation $$E = \frac{1}{2}CV^2$$

where E is the energy in joules, C is the capacitance in farads and V is the rated or operating voltage of the supercapacitor. The distinguishing feature of supercapacitors are the particularly high values of capacitance. Another measure of supercapacitor performance is the ability to store and release the energy rapidly; this is the power, P, of a supercapacitor and is given by $$P = \frac{V^2}{4R}$$

where R is the internal resistance of the supercapacitor. For electrochemical capacitors and batteries, it is more common to refer to the internal resistance as the equivalent series resistance or ESR. As can be deduced from the foregoing equations, the power performance is strongly influenced by the ESR of the entire device, and this is the sum of the resistance of all the materials, for instance, carbon, substrate, binder, separator, electrolyte and the contact resistances as well as the external contacts.

The product of resistance and capacitance (RC), commonly referred to as the time constant, is frequently used to characterise capacitors. In an ideal capacitor, the time constant is frequency independent. However, in carbon based supercapacitors, both R and C are frequency dependent. This arises from the micro-porous characteristics of high surface area carbons, and the nature of charge build up at the electric double layer on the carbon surface. The traditional method of measuring R and C for supercapacitors is to use a constant current charge or discharge and to measure the voltage jump at the start or finish of the cycle, and the rate of change of voltage during the cycle respectively. This however, effectively provides the R at high frequency and the C at low frequency. Another more suitable method is to measure the frequency response of the complex impedance and to model a simple RC element to the data. This provides an estimate of R and C across the frequency range that may or may not correlate with those measured using constant current techniques. Clearly, the use of RC time constant as a measure of capacitor suitability is subject to a large uncertainty. A more useful technique has recently been proposed in which R and C are measured at the frequency at which the phase angle of current and voltage is −45°. The reciprocal of this frequency is the "response time" and is more clearly defined than other methods. Further, the capacitance at this frequency can then be used to calculate the energy and provide a Figure of Merit (FOM) when normalised with respect to the mass or volume of the supercapacitor.

It will be appreciated that a gravimetric FOM is a figure of merit more appropriate for use with energy storage devices intended for pulse power applications. That is, such applications are by necessity frequency dependent and, as such, the calculation of the figure of merit involves first identifying the frequency $f_o$ at which the impedance of the storage device reaches a −45° phase angle. A reciprocal of $f_o$ then provides a characteristic response time $T_o$ for the storage device. The value of the imaginary part of the impedance $Z''$ at $f_o$ is used to calculate the energy $E_o$ that the device is able to provide at that frequency. More particularly:

$$E_o = \frac{1}{2} CV^2$$

where $C=-1/(2\pi f_o Z'')$ and V is the rated voltage of the device. The gravimetric figure of merit is then calculated by dividing $E_o$ by the mass of the device and by $T_o$. That is, gravimetric $FOM=E_o/(m \cdot T_o)$.

The gravimetric figure of merit has been suggested by John R. Miller in a paper entitled "Pulse Power Performance of Electrochemical Capacitors: Technical Status of Present Commercial Devices" for the "8th International Seminar on Double Layer Capacitors and Similar Energy Storage Devices", Deerfield Beach, Fla., Dec. 7-9, 1998. The teachings of and disclosure within that paper are incorporated herein by way of cross-reference.

Also detailed in the Miller paper is the calculation of a volumetric figure of merit (volumetric FOM) which is based upon $E_o$ divided by both $T_o$ and the volume of the device. The volumetric FOM is expressed in terms of Watts/cm³.

These figures of merit provide a different characterisation of storage devices which is more in keeping with the frequency dependent nature of pulse power and other such applications to which the devices are being applied. It should also be noted that the performance of the devices can not be adequately explained by the hitherto utilised simple RC model. Such simple models do not account for the frequency dependent nature of either pulsed or high power applications, whereas the FOM used to characterise the present invention is a parameter directly relevant to such applications.

Another figure useful in assessing the performance of a supercapacitor is Effective Capacitance (Ce). Effective Capacitance (Ce) is the capacitance obtained during a constant current discharge at a specified time and is derived from an RC electrical model of the supercapacitor's measured discharge, where R (or ESR) is measured at a predetermined time, say 20 μs (microseconds) and held constant in the model. The discharge current used here is typically 100 mA. Ce is thus time dependant. The weight used here to calculate the specific gravimetric Effective Capacitance in a supercapacitor is generally the total mass of the device. For dissimilarly packaged or structured devices, a comparison of Ce may be made by comparing the mass of the active coatings, or active materials within coatings, for the devices.

Each electrode may be formed from a single sheet which may be folded or rolled and multiple flat sheets stacked together and electrically connected in parallel. This is referred to here as an electrode stack, such as is described in more detail in commonly-owned publication WO/2000/034964.

There is a relationship between the footprint of an electrode stack and the thickness required to meet predetermined ESR and capacitance values. ESR varies primarily with electrode area, so a smaller footprint requires a proportionally larger number of layers to maintain the same ESR. Capacitance varies with volume of coating, so smaller footprints can be at least partially compensated for by thicker coatings.

In many cases, the physical and electrochemical properties of the electrolyte are a key factor in determining the internal resistance (ESR) of the supercapacitor and the "frequency response" of the supercapacitor, i.e. the ability of the supercapacitor to provide power over various frequency ranges.

The factors influencing the conductance (κ) of an electrolyte solution are described in detail in an article by B. E. Conway taken from "The Fourth International Seminar on Double Layer Capacitors and Similar Energy Storage Devices", Dec. 12-14, 1994, held at Ocean Resort Hotel and Conference Centre, Deerfield Beach, Fla. and co-ordinated by Florida Educational Seminars, Inc., 1900 Glades Road, Suite 358, Boca Raton, Fla. 33431.

In summary, there are two principle factors which are involved in determining the conductance—these are:
a) the concentration of free charge carriers, cations and anions; and
b) the ionic mobility or conductance contribution per dissociated ion in the electrolyte.

There are a number of sub factors which in turn influence these two principle factors. These are:
The solubility of the selected salt.
The degree of dissociation into free ions and factors such as the extent of ion-pairing of the ionic species. This in turn is influenced by the salt concentration, temperature and the dielectric constant of the solvent.
The viscosity of the solvent, which is a temperature dependent property. As temperature increases, there is a corresponding decrease in viscosity.

Solvents for supercapacitors can thus be designed with the following criteria in mind:
Solvency for selected ionic species
Degree of dissociation of cation/anion pairing in solution
Dielectric constant
Electron-pair donicity
Permits high ion mobility
Extent of solvation of free ions and radii of solvated ions
Temperature coefficient of viscosity (i.e. low viscosity in the intended temperature range); and
Ion pairing equilibria.

There is also the necessity for the electrolyte to be chemically stable. Aqueous electrolytes, such as sulphuric acid and potassium hydroxide solutions, are often used as they enable production of an electrolyte with high conductivity. However, water is susceptible to electrolysis to hydrogen and oxygen and as such has a relatively small electrochemical window of operation outside of which the applied voltage will degrade the solvent. In order to maintain electrochemical stability in applications requiring a voltage in excess of 1.0 V, it is necessary to employ supercapacitor cells in series, which leads to an increase in size, a reduction in capacitance and an increase in ESR in comparison to a non-aqueous device which is capable of producing an equivalent voltage. Stability is important when one considers that the supercapacitors may remain charged for long periods and must charge and discharge many hundreds of thousands of times during the operational lifetime of the supercapacitor.

There are of course processing requirements on the solvent also, such as cost, toxicity, purity and dryness considerations for non-aqueous systems.

Non aqueous solvents commonly used in related fields, e.g. batteries, can be classified as: high dielectric constant aprotic (e.g. organic carbonates), low dielectric constant with high donor number (e.g. dimethoxyethane, tetrahydrofuran or dioxolane), low dielectric constant with high polarisability (e.g. toluene or mesitylene) or intermediate dielectric constant aprotic (e.g. dimethylformamide, butyrolactone) solvents.

However, in addition to the specific electrolyte requirements of supercapacitors mentioned above, there is also the practical consideration that supercapacitors do not operate in isolation. Rather, in use, they are in confined environments in the presence of components which generate high temperatures, and like the other components, this must be borne in mind when selecting the electrolyte and/or electrolyte solvent. Also, it needs to be borne in mind that the supercapacitors must be capable of operation at start-up at temperatures much lower (even into the sub zero range) than the high operating temperatures referred to above.

The use of supercapacitors in environments that require dimensionally stable housings has become highly desirable. Supercapacitors in soft packages are suitable for use in small numbers of high-end hand held devices and the like, however, soft packages are not so suitable for use in demanding environments, such as motor vehicles or where highly automated assembly is used. The use of rigid packages, which can be surface mounted is desirable, however, surface mount technology (SMT) has its own drawbacks, including instances of thermal shock during manufacture.

The soldering of a supercapacitor to a circuit board in a surface mount process, such as reflow, creates high temperatures over a relatively short time period. This heat is in part conducted along a supercapacitor's terminal and into the body of the supercapacitor and in part through the package walls. Due to its generally small mass, a supercapacitor is therefore susceptible to large thermal shock, as only a small amount of heat is required to raise its temperature rapidly. Where large thermal shock is experienced, expansion, separation or vaporisation of the electrolyte may occur, which may cause performance impairment and may ultimately lead to the supercapacitor's destruction. Considerable care must therefore be taken in selecting an electrolyte and/or electrolyte solvent, which is capable of withstanding short bursts of high thermal energy.

OBJECT OF THE INVENTION

It is an object of the present invention to overcome or ameliorate at least one of the disadvantages of the prior art, or to provide a useful alternative.

It is an object of the invention in its preferred form to provide a supercapacitor that is substantially capable of withstanding high thermal shock and affording a broad range of operating temperature.

SUMMARY OF THE INVENTION

According to a first aspect the invention provides a supercapacitor comprising: at least one pair of electrodes having a mixture of carbon particles on facing surfaces of the at least one pair of electrodes;
a porous separator positioned between the facing surfaces of the at least one pair of electrodes; and
an electrolyte for wetting the separator wherein the electrolyte comprises an ionic liquid.

Preferably the ionic liquid comprises a cation selected from the group consisting of tetraalkylammonium, di-, tri- and tetra-alkylimidazolium, alkylpyridinium, dialkylpyrrolidinium, dialkylpiperidinium, tetraalkylphosphonium and trialkylsulfonium.

Preferably the ionic liquid comprises a anion selected from the group consisting of $F^-$, $Br^-$, $Cl^-$, $I^-$, $BF_4^-$, $B(CN)_4^-$, $CH_3BF_3^-$, $CH_2CHBF_3^-$, $CF_3BF_3^-$, $C_2F_5BF_3^-$, $n$-$C_3F_7BF_3^-$, $n$-$C_4F_9BF_3^-$, $C_4F_9SO_3^-$, $N(C_2F_5SO_2)_2^-$, $PF_6^-$, $AsF_6^-$, $CF_3CO_2^-$, $CF_3SO_3^-$, $N(SO_2CF_3)_2^-$; $C(SO_2CF_3)_3^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$.

Preferably the ionic liquid is selected from the group consisting of [MeMeIm][N(CF$_3$SO$_2$)$_2$]; [EtMeIm][BF$_4$]; [EtMeIm][C(CF$_3$SO$_2$)$_2$]; [EtMeIm][N(CF$_3$SO$_2$)$_2$]; [EtMeIm][CF$_3$CO$_2$]; [EtMeIm][CF$_3$SO$_3$]; [EtMeIm][CF$_3$CO$_2$]; [EtMeIm][N(CF$_3$SO$_2$)$_2$]; [EtMeIm][N(C$_2$F$_5$SO$_2$)$_2$]; [EtMeIm][N(CN)$_2$]; [EtEtIm][CF$_3$SO$_3$]; [EtEtIm][N(CF$_3$SO$_2$)$_2$]; [1,2-Me$_2$-3-EtIm][N(CF$_3$SO$_2$)$_2$]; [1-Et-2,3-Me$_2$Im][N(CF$_3$SO$_2$)$_2$]; [1-Et-3,5-Me$_2$Im][N(CF$_3$SO$_2$)$_2$]; [1-Me$_2$Im][CF$_3$SO$_3$]; [1-Et$_2$-3,5-MeIm][N(CF$_3$SO$_2$)$_2$]; [1,2-Et$_2$-3-MeIm][N(CF$_3$SO$_2$)$_2$]; [1,3-Et$_2$-4-MeIm][N(CF$_3$SO$_2$)$_2$]; [1,3-Et$_2$-5-MeIm][N(CF$_3$SO$_2$)$_2$]; [BuMeIm][BF$_4$]; [BuMeIm][PF$_6$]; [BuMeIm][N(CF$_3$SO$_2$)$_2$]; [BuMeIm][CF$_3$SO$_3$]; [BuMeIm][C$_4$F$_9$SO$_3$]; [BuMeIm][N(CF$_3$SO$_2$)$_2$]; [iBuMeIm][N(CF$_3$SO$_2$)$_2$]; [BuEtIm][N(CF$_3$SO$_2$)$_2$]; [BuEtIm][CF$_3$CO$_2$]; [BuMeIm][C$_4$F$_9$SO$_2$]; [BuMeIm][C$_3$F$_7$CO$_2$]; [BuMeMeIm][BF$_4$]; [BuMeMeIm][PF$_6$]; [PrMeIm][BF$_4$]; [PrMeMeIm][N(CF$_3$SO$_2$)$_2$]; [iPrMeIm]][N(CF$_3$SO$_2$)$_2$]; [1,2-Me$_2$-3-PrIm][N(CF$_3$SO$_2$)$_2$]; [MeMePy][CF$_3$SO$_2$NCOCF$_3$]; [EtMePy][N(CN)$_2$]; [PrMePy][N(CF$_3$SO$_2$)$_2$]; [PrMePy][N(CN)$_2$]; [HexMePy][N(CN)$_2$]; [Me$_3$BuN][CF$_3$SO$_2$NCOCF$_3$]; [Me$_3$EtN][CF$_3$SO$_2$NCOCF$_3$]; [PrMe$_3$N][N(CF$_3$SO$_2$)$_2$]; [Et$_4$N][N(CF$_3$SO$_2$)$_2$]; [MePrPp][N(CF$_3$SO$_2$)$_2$]; [BuPi][BF$_4$]; and [BuPi][N(CF$_3$SO$_2$)$_2$].

More preferably the ionic liquid is [EtMeIm][BF$_4$]. An alternative preferred ionic liquid is EMITFSI.

Preferably the electrolyte conductivity is at least 1 mS/cm at 25° C. Preferably the ionic liquid remains ionically conductive at or below −10° C. Preferably the ionic liquid has a decomposition point greater than or equal to 260° C. Preferably the ionic liquid does not contribute to the decomposition of the electrode at external temperatures equal to 260° C.

In an alternative embodiment, the electrolyte also comprises a solvent. The solvent is selected and provided in an amount such that, at a predetermined temperature:
i) the conductivity of the solvent/ionic liquid mixture is higher than the conductivity of the ionic liquid alone; and
ii) the vapour pressure of the solvent/ionic liquid mixture is not significantly higher than the vapour pressure of the ionic liquid alone.

The solvent is preferably selected and provided in an amount such that at 260° C. it increases conductivity by at least 50% and more preferably by at least 150% relative to the conductivity of the ionic liquid alone. The solvent is preferably selected and provided in an amount such that at 260° C. it increases vapour pressure by less than 4 bar, more preferably less than 2 bar and most preferably less than or equal to 0.25 bar relative to the vapour pressure of the ionic liquid alone. Most preferably, the solvent is selected and provided in an amount such that at 260° C. it increases conductivity by at least 50% and increases vapour pressure by less than or equal to 0.25 bar.

The solvent is preferably selected from carbonates, for example ethylene carbonate and propylene carbonate, lactones, such as γ-butyrolactone or nitriles such as glutaronitrile. The solvent is preferably present in an amount of around less than 50 wt % of the electrolyte, and more preferably in an amount of around 20-40 wt % of the electrolyte.

Preferably the electrode substrate is aluminium foil. Preferably the mixture of carbon particles comprises carbon having a surface area of at least 100 m$^2$ per gram, and more preferably a surface area of at least 400 m$^2$ per gram.

Preferably the mixture of carbon particles is in the form of a coating between 1 and 500 microns thick, and more preferably the mixture of carbon particles is in the form of a coating between 5 and 100 microns thick. Preferably the mixture of carbon particles comprises a binder, preferably selected from the group consisting of cellulosic materials, rubbers and fluorinated resins. More preferably the binder is carboxymethylcellulose (CMC) in sodium (NaCMC) and/or protonated (HCMC) form. An alternative preferred binder is PVdF or PTFE. In one particularly preferred embodiment, the supercapacitor of the present invention comprises a mixture of carbon particles about 20 microns thick and which contains about 65% activated carbon, about 25% conductive carbon, and about 10% of binder.

Preferably the porous separator is selected from the group consisting of cellulosic material (preferably paper) and porous plastics preferably selected from the group consisting of polypropylene, polyethylene, nylon, polyimide and, PTFE.

The supercapacitor of the present invention is preferably contained in packaging with a thermal conductivity of less than about 1 Watt per meter Kelvin (W/(m·K)), and more preferably contained in packaging with a thermal conductivity of less than about 0.2 Watt per meter Kelvin (W/(m·K).

The supercapacitor of the present invention is preferably contained in packaging with a volumetric specific heat capacity of about 2 joules per cubic meter per degree Kelvin (J/m$^3$/K) or greater.

The supercapacitor of the present invention preferably has a maximum operating voltage of between 2.3 and 2.75 V. The supercapacitor of the present invention preferably has an ESR between 0.5 and 5 Ohm square centimeters (Ohm·cm$^2$) at 23 degrees Celsius.

The supercapacitor of the present invention preferably has a capacitance of between about 10 and 50 Farads per cubic centimeter (F/cm$^3$) of coating at 23 degrees Celsius. The supercapacitor of the present invention preferably has an ESR of between about 4.2 Ohm·cm$^2$ to about 0.8 Ohm·cm$^2$. More preferably, the supercapacitor of the present invention preferably has an ESR of about 1 Ohm·cm$^2$ and a capacitance of about 30 F/cm$^3$.

The supercapacitor of the present invention preferably has a Ce of at least 1.0 F/g at 1 ms, and more preferably a Ce of at least 3.0 F/g at 100 ms. More preferably, the supercapacitor of the present invention preferably has a Ce of at least 1.0 F/g at 1 ms and a Ce of at least 3.0 F/g at 100 ms The supercapacitor of the present invention preferably has an ESR rise rate at 2.3V of <60 mΩ/kHr, more preferably an ESR rise rate at 2.3V of between 10 and 20 mΩ/kHr. Alternatively the supercapacitor of the present invention more preferably has an ESR rise rate at 2.3V of <10 mΩ/kHr.

The supercapacitor of the present invention preferably has a capacitance loss rate at 2.3V of $<3\times10^{-4}$ F/kHr, more preferably a capacitance loss rate at 2.3V of $<1\times10^{-4}$ F/kHr. Even more preferably, the supercapacitor of the present invention has a capacitance loss rate at 2.3V of about $5\times10^{-5}$ F/kHr.

Preferably, the supercapacitor of the present invention is formed with an ionic liquid in a surface mount capable unit, preferably a prismatic unit.

BRIEF DESCRIPTION OF THE DRAWINGS

A preferred embodiment of the invention will now be described, by way of example only, with reference to the accompanying drawings in which:

FIG. 3 is a side view of a second embodiment charge storage device according to the invention in the form of a prismatic supercapacitor;

FIG. 4 is a top view of the supercapacitor of FIG. 3;

FIG. 5 is a sectional view taken along line 5-5 of FIG. 4;

FIG. 6 is an end view of the supercapacitor of FIG. 3 with the terminal assembly removed;

FIG. 7 is an exploded perspective view of the supercapacitor package of FIG. 5.

DETAILED DESCRIPTION

The present invention is described with reference to the supercapacitors developed by the present applicant and disclosed in detail in PCT/AU98/00406, PCT/AU99/00278, PCT/AU99/00780, PCT/AU99/01081, PCT/AU00/00836, PCT/AU00/01029, PCT/AU01/00553, and PCT/AU01/01613 the contents which are incorporated herein by cross-reference. It will be appreciated by those skilled in the art that the present application uses those supercapacitors in some embodiments and that in the present instance, the electrolyte system is the variable of interest. However, it will be appreciated by those skilled in the art that the electrolyte system of the present application will be equally applicable for use in other energy devices of different design.

Many commercial capacitors using commercial materials are limited in their performance by their dimensions. The supercapacitors developed by the present applicant overcome this dimensionality problem by using as a coating material an extremely high surface area carbon. These supercapacitors have extremely good power densities.

In very broad terms, in addition to the general makeup of a supercapacitor, as described above, the applicant's supercapacitor additionally comprises electrodes consisting of metal current collectors and a coating material, whereby the metal offers significantly less resistance than the coating material. The coated electrodes and intermediate separator can be either stacked or wound together. The electrodes and separator are impregnated with an electrolyte and disposed within a housing.

In such supercapacitors the electrode material may be constructed as a bed of highly porous carbon particles with a very high surface area. For example, surface areas may range from 100 m$^2$ per gram up to greater than 2500 m$^2$ per gram in certain preferred embodiments. Preferably the surface area is at least 400 m$^2$ per gram. The carbon matrix is held together by a binding material that not only holds the carbon together (cohesion) but it also has an important role in holding the carbon layer onto the surface of the current collecting substrate (adhesion). The carbon may be in the form of, for example, activated carbon. As will be appreciated by those skilled in the art, the activated carbon provides a large effective surface area and, as such, is a preferred material for optimising capacitance.

Figure 1:
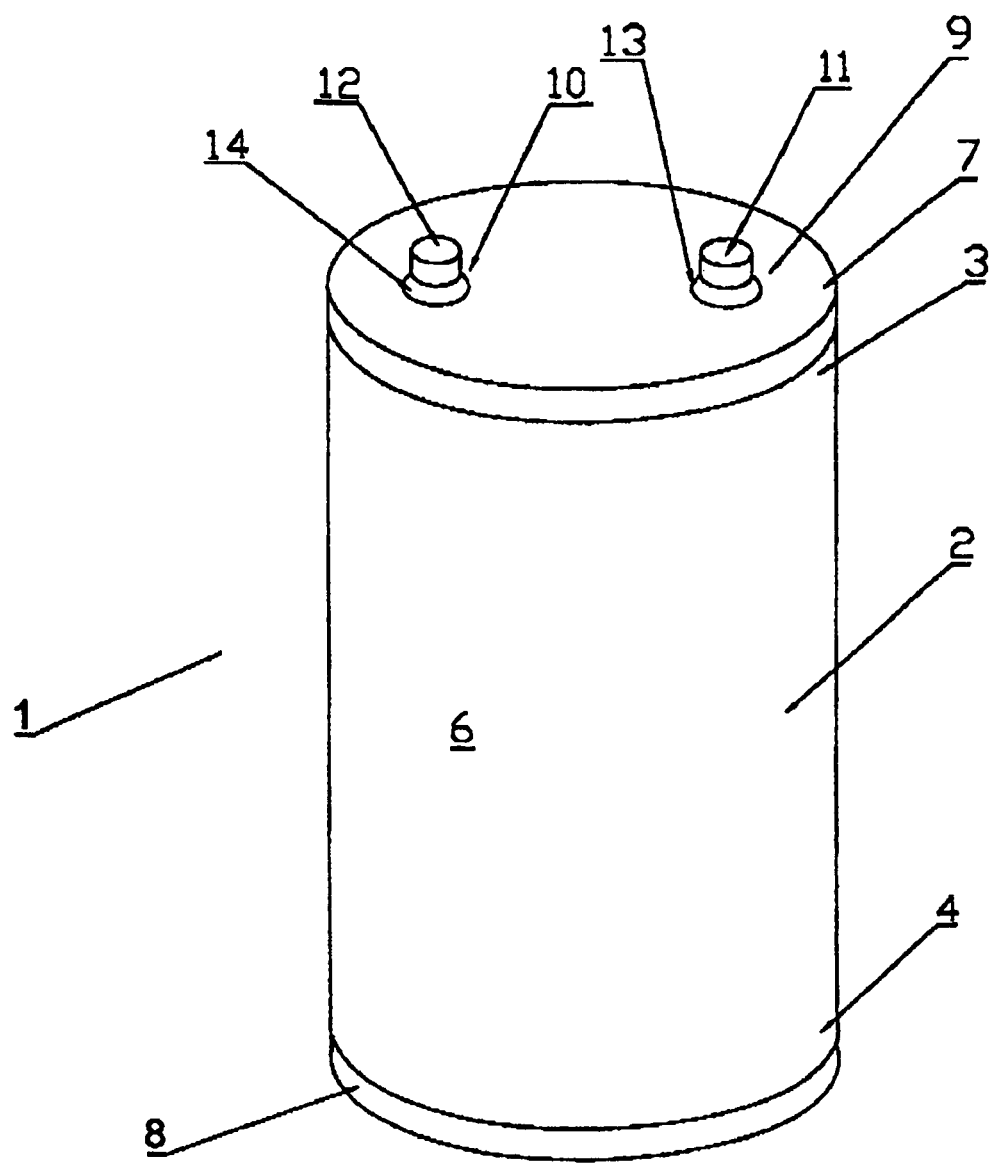
FIG. 1 is a perspective view of a first embodiment charge storage device according to the invention in the form of a can supercapacitor.

Referring now to FIG. 1, there is illustrated one embodiment of an energy storage device according to the invention in the form of a supercapacitor 1. Supercapacitor 1 is packaged in a cylindrical housing 2 which extends axially between a first end 3 and a second spaced apart end 4. In other embodiments differently configured housings are used.

The housing has a cylindrical sidewall 6 and, disposed adjacent to respective ends 3 and 4, a circular top 7 and base 8. All adjacent edges of the base, sidewall and top are sealingly engaged. In this embodiment housing 2 is formed from metal and top 7 and base 8 are sealingly adhered to sidewall 6.

Top 7 includes two diametrically spaced apart ports 9 and 10 for sealingly receiving respective terminals 11 and 12. The terminals extend from within housing 2 where they are electrically connected to respective ones or sets of electrodes of supercapacitor 1. Although a large number of possible electrodes are used in various embodiments of the invention, the most preferred will be discussed in more detail below.

Terminals 11 and 12 are sealingly retained within the respective ports by rubber seals 13 and 14.

Figure 2:
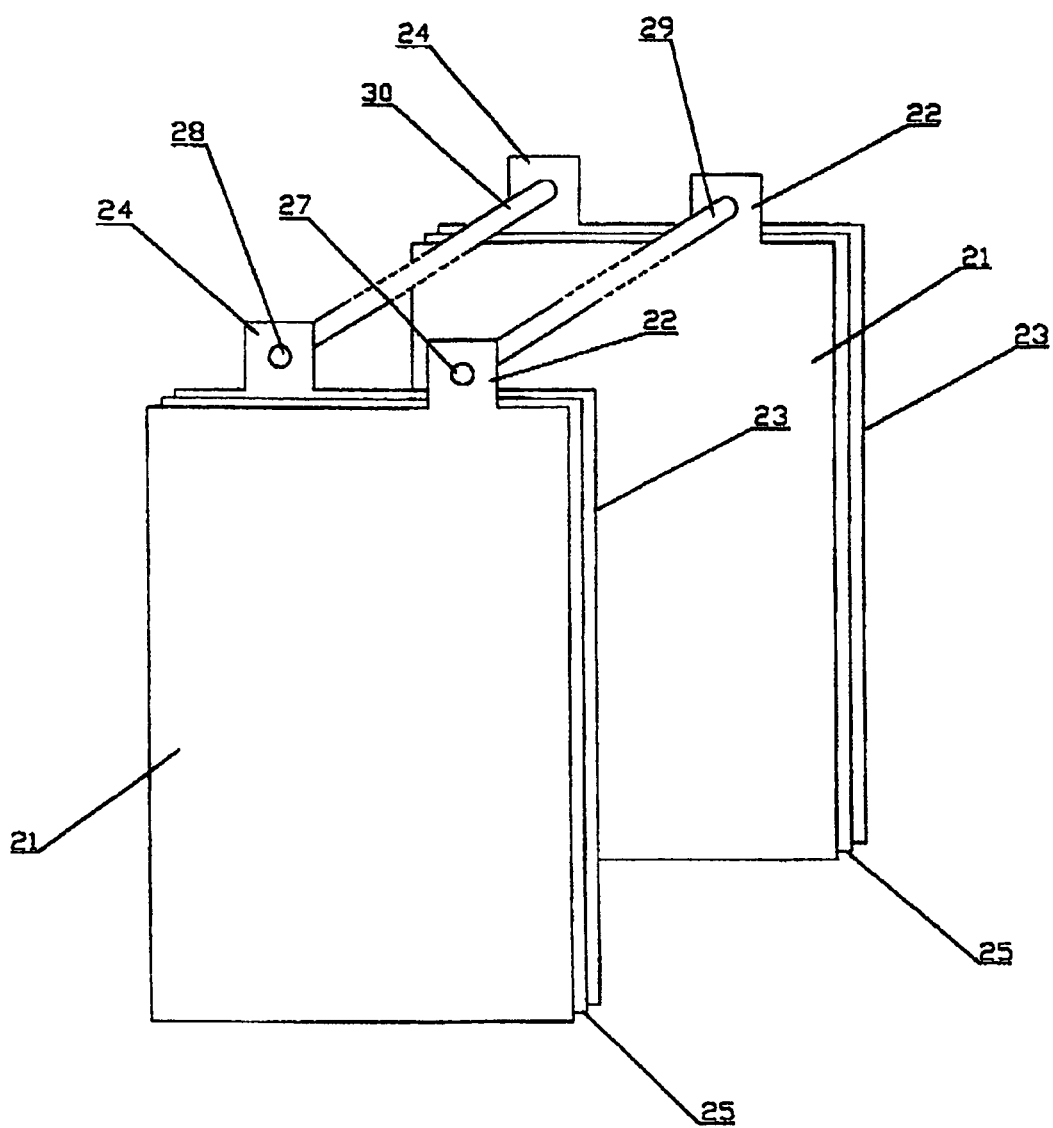
FIG. 2 is a schematic view of an electrode.

A first preferred electrode configuration is illustrated in FIG. 2. More particularly, in this embodiment, supercapacitor 1 includes a plurality of first sheet electrodes 21 having respective first tabs 22 extending therefrom. A plurality of like second sheet electrodes 23 are alternated with electrodes 21 and have respective second tabs 24 extending therefrom. A plurality of porous sheet separators 25 is disposed between the adjacent electrodes. As described with reference to FIG. 1, housing 2 contains electrodes 21 and 23, separators 25 and an electrolyte (not shown). Tabs 22 are electrically connected to terminal 11 and tabs 24 are electrically connected to terminal 12 to allow external electrical connection to the respective electrodes.

It will be appreciated that although in FIG. 2 there are illustrated two electrodes 21 and two electrodes 23, the actual embodiment can include a greater number of such sheet electrodes which are all interconnected to provide a predetermined capacitance. The invention, in this form, is particularly advantageous in that the modular unit of capacitance—one electrode 21, one electrode 23 and an intermediate separator 25—is easily mass produced and combined with a plurality of like units to provide the necessary capacitance for a particular application. Accordingly, a supercapacitor having specific performance characteristics is able to be produced easily and in small numbers at a unit cost not dissimilar to that of a large run. In some embodiments a different sized housing is required.

Tabs 22 and 24 include respective centrally disposed apertures 27 and 28. These apertures receive respective conductive rods 29 and 30 for electrically interconnecting like tabs. The rods are, in turn, electrically connected within housing 2 to respective electrodes 11 and 12.

In some embodiments two adjacent electrodes 21 and 23 are folded together to reduce one dimension of the electrodes. This is particularly advantageous in circumstances where the packaging requirements are very specific, although a known capacitance is required.

In another embodiment, a similar effect is achieved through use of two or more sheet electrodes, and one or more intermediate separators, which are wound together in a spiral. The two sheet electrodes are longitudinally elongate and transversely offset such that their opposed edges define the respective tabs. In this embodiment, the length of the sheet electrodes is tailored for the specific capacitance requirements.

Typically, activated carbon powder is combined with a binder and a solvent to make a paste. The paste is spread on aluminium foil and dried, to form electrodes.

The coating containing a predetermined proportion of activated carbon, in a predetermined thickness, is applied over an area which extends lengthways along a strip of conductive foil to form a strip electrode. The application may take place by printing, coating dry-applying and fusing. The coating may be a paste, ink or other compound. The coating will typically comprise a paste having a composition of about 80% activated carbon, about 20% conductive carbon and between 3 and 15% binder, but these proportions may vary widely.

The coating will usually be between 1 and 500 microns thick, or more particularly between 5 and 100 microns thick, and it may be applied to one or both sides of the foil. The foil will likely be aluminium but could be any other suitable conductive metal or a conductive plastic. The foil or other conductive material may be pre-treated to enhance its conducting, adhesive or other properties. Preferably the electrode substrates are aluminium foil.

In certain embodiments preferably the paste is about 20 microns thick and contains about 65% activated carbon, about 25% conductive carbon, and about 10% of binder. These ratios can be varied to obtain different electrical and physical properties as required by the area of use of the supercapacitor. In some embodiments the coating of a mixture of carbon and binder can be approximately 100 microns thick, in others it is about: 35; 15; 6; 3; or 1 microns thick as best suited to the electrical requirements of the supercapacitor.

Suitable separators may be selected from the group consisting of cellulosic material (e.g. paper), porous plastics (eg. polypropylene, polyethylene, nylon, polyimide, PTFE). Alternatively, the separator may be coated with a suitable thermal resistant coating, yielding a heat resistant separator.

Polyimide separators are particularly preferred, as they are highly compatible with IL's (ionic liquids) in imparting long term stability to the devices of the present invention.

Suitable binders may be selected from cellulosic materials (e.g. CMC), rubbers, fluorinated resins (e.g. PVdF, PTFE). The preferred embodiment is carboxy methyl cellulose (CMC) in either sodium (NaCMC) or protonated (HCMC) forms, or a combination of both.

Preferably, two types of carbon are used in the capacitor. First, a high surface area carbon such as an activated carbon and, secondly, a conductive carbon such as a carbon black.

Because the binder is in intimate contact with the electrolyte, it is important that the binder and electrolyte are fully compatible. It has been found in the present invention that IL's such as EMITSFI either alone or in combination with relatively modest amounts of solvent, are highly compatible with CMC as a binder for carbon particles. This is manifested in sustained device performance, and also in device autopsies, which show the carbon layer to be in good order and also the electrolyte to be largely uncontaminated with carbon particles, even after extended use.

Referring now to FIGS. 3 to 7, there is illustrated a further embodiment of an energy storage device according to the invention in the form of a supercapacitor 101. The supercapacitor includes, as best shown in FIG. 5, an energy storage element in the form of two like stacked supercapacitive cells 102 and 103 that are connected to each other in series. A two-piece generally prismatic sealed package 104 defines an interior 105 to contain cells 102 and 103. Package 104 includes a substantially planar access sidewall 106 having two spaced apart apertures 107 and 108 extending from interior 105 to an exterior of the package. A terminal assembly, in the form of two spaced apart metal terminals 109 and 110, are electrically connected to cells 102 and 103 respectively, and extend through respective apertures 107 and 108 to allow external electrical connection to the cells.

Package 104 is collectively defined by a generally rectangular prismatic container 111 and a separate generally flat rectangular second sidewall 112. Container 111 includes a base 113 and four sidewalls 106, 114, 115 and 116 that extend upwardly from base 113 to collectively define a first continuous abutment surface 117. Apertures 107 and 108 are spaced apart from abutment surface 117 and substantially equally spaced between base 113 and surface 117. In other embodiments, use is made of alternative location and spacing of apertures 107 and 108.

In some embodiments package 104 is formed by means of injection moulding of the polymer. In other embodiments, package 104 is formed by means of press-moulding. In yet other embodiments package 4 is formed by means of injection-compression moulding.

Sidewall 112 includes a second abutment surface 118 that extends continuously about the periphery of the sidewall for complementarily engaging with surface 117. More particularly, in use, surfaces 117 and 118 are opposed with and bonded to each other to form sealed package 104. The bond between the abutment surfaces creates a hermetic seal and is achieved by one or more of heat sealing or ultrasonic welding.

In other embodiments package 104 includes more than one access sidewall. For example, in some embodiments, one of apertures 107 and 108 is in sidewall 106, while the other of the apertures is in sidewall 115. In further embodiments, the apertures, and the respective terminals, extend through respective other sidewalls or the base. Another example includes those embodiments where device 101 is used with external balancing resistors. Particularly, device 101 includes two flexible aluminium tabs 137 and 138 that extend outwardly from respective cells 102 and 103 and which are soldered or otherwise fixedly electrically engaged with respective terminals 109 and 110. An interconnecting flexible aluminium tab 139 extends between cells 102 and 103 to electrically connect the two cells. The combination of tabs provides for a series connection of the cells, and for those serial connected cells to be electrically included within a circuit. The balancing resistors are usually two like resistors, one which is at least electrically and often also physically connected to both tabs 137 and 139, and the other which is at least electrically and often also physically connected to both tabs 138 and 139. In some embodiments, the balancing resistors are contained within interior 105. In other embodiments, the balancing resistors are contained within channels or cavities within one or more of the sidewalls or base, while in other embodiments the balancing resistors or printed, bonded or otherwise mounted to the interior surface of one or more of the base or sidewalls. In other embodiments, the one or more balancing resistors are printed, bonded or otherwise attached to the exterior face of one or more of the sidewalls or base, or a channel or other formation in those sidewalls or base.

In those embodiments where device 101 is designed to cooperate with separate balancing resistors, an additional like terminal (not shown) is mounted in a complementary aperture in sidewall 115. That is, in these embodiments, sidewall 115 also defines an access sidewall. The terminal includes an interior end that is soldered or otherwise electrically and physically engaged within tab 139, and an external end that is available for connection with external electrical components or circuitry.

In further embodiments container 111 includes other than four sidewalls. For example, in some embodiments the sidewalls are joined to each other by intermediate bevelled sidewalls, while in still further embodiments, use is made of five or more sidewalls.

A key component of the present invention is the presence of a suitable ionic liquid (IL) electrolyte. The IL electrolyte should be chemically and electrochemically stable, compatible with carbon, and operate at sub-zero temperatures.

Ionic liquids are low melting temperature salts that form liquids comprised of cations and anions. According to current convention, a salt melting below the boiling point of water is known as a room temperature ionic liquid (RTIL), or simply ionic liquid (IL) or by one of many synonyms including low/ambient/room temperature molten salt, ionic fluid, liquid organic salt, fused salt, and neoteric solvent.

Anions that form room temperature ionic liquids are usually weakly basic inorganic or organic compounds that have a diffuse or protected negative charge. Cations that produce low melting point ionic liquids on the other hand are generally organic species with low symmetry and include for example imidazolium, pyrazolium, triazolium, thiazolium, and oxazolium cations.

Ionic liquids have the advantage over conventional electrolytes in that they are generally non-volatile, non-flammable, and exhibit relatively high ionic conductivity.

Due to cold temperatures, which may be experienced by a supercapacitor in an electrical device, suitable ILs should preferably possess liquid characteristics below about $-10°$ C., more preferably below about $-20°$ C., even more preferably below about $-30°$ C. and most preferably below about $-40°$ C.

As supercapacitors are typically used in confined environments in the presence of components which generate high temperatures, ILs should also be stable at a normal operating temperature of about 85° C., more preferably about 100° C., and even more preferably about 130° C.

The IL must also be capable of withstanding normal manufacturing temperatures, such as those associated with the fabrication of a supercapacitor device. A supercapacitor is typically heated in an oven, once an electrolyte has been added to drive out excess moisture around the carbon electrolyte. The IL should therefore preferably be able to withstanding normal manufacturing temperatures, which range from about 80° C., more preferably 100° C., and even more preferably 130° C.

The soldering of a supercapacitor to a circuit board in a surface mount process, such as reflow, exposes the supercapacitor to a substantial amount of heat over a relatively short time period. The IL should therefore be able to withstand high thermal shock without deterioration at temperatures up to about 160° C., about 180° C. or about 200° C. More preferably the IL should be able to withstand high thermal shock without deterioration at temperatures of up to about 230° C. and even more preferably to about 260° C. The amount of time that they need to withstand these temperatures is about 30 seconds, more preferably 60 seconds and even more preferably 90 seconds.

The stability of ILs with respect to high voltage differences is also important when considering their use in electrochemical applications. ILs decompose when voltage differences larger than their electrochemical window are applied. Preferably the IL should be stable to between 2.3 and 2.75 V cell voltage, which is the typical operating voltage for a supercapacitor. Ideally the IL should be stable at up to 3.0 V. It is also important that the IL has a high conductivity and as low a contribution to device ESR as possible. Preferably the conductivity of the IL is up to 20 mS/cm. Preferably the conductivity should be at least 1 mS/cm at 25° C., and at least 0.2 mS/cm at −20° C.

Two of the mechanisms of performance loss in supercapacitors are the slow degradation of the interface between the coating and the substrate and the slow degradation of the coating itself. Both of these contribute to an increase in the cell ESR and a loss of capacitance. The rate of these degradations are temperature dependent. They also depend on the specific chemical reactions within the cell, such as between the electrolyte and the electrode. It is thought that exposure to the very high temperatures of surface mount processes tend to cause a temporary acceleration in these and other degradation mechanisms, often to the extent the device is no longer fit for its intended purpose. The embodiments disclosed here are designed, in addition to other performance requirements, to minimise any degradation that occurs through reaction of the ionic liquid electrolyte with other cell components, such as the electrode.

To ensure that these undesirable reactions are minimised it can be desirable to design packages that reduce the amount of heat that can enter into the cell and cause the acceleration of degradation reactions between the electrolyte and the electrodes. This can be achieved by using packaging material that shields the contents from the exterior heat, such packaging materials have low thermal conductivity. In one embodiment the thermal conductivity of the package is less than about 1 Watt per meter Kelvin (W/(m·K)) and in another it is about 0.2 W/(m·K) or less. Suitable thermal shielding materials include: air; Nomex®; silicones and plastics such as LCP.

To further reduce the effect of external heat, the package can be designed with a high thermal mass. To keep device size to a minimum the packaging material used in some embodiments has a volumetric specific heat capacity of about 2 joules per cubic meter per degree Kelvin (J/m$^3$/K) or greater. Suitable thermal management materials include: silicones; epoxies; metals and phase change materials.

ILs suitable as electrolytes for supercapacitors include, although are not limited to, those with cations based on tetraalkylammonium, di-, tri- and tetra-alkylimidazolium, alkylpyridinium, dialkylpyrrolidinium, dialkylpiperidinium, tetraalkylphosphonium and trialkylsulfonium. Suitable anions include, although are not limited to, F$^-$, Br$^-$, Cl$^-$, I$^-$, BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, C$_4$F$_9$SO$_3^-$, N(C$_2$F$_5$SO$_2$)$_2^-$, PF$_6^-$, ASF$_6^-$, CF$_3$CO$_2^-$, CF$_3$SO$_3^-$, N(SO$_2$CFO$_2$, C(SO$_2$CF$_3$)$_3^-$, N(COCF$_3$)(SO$_2$CF$_3$)$^-$, N(SO$_2$F)$_2^-$, N(CN)$_2^-$, C(CN)$_3^-$, C(CH$_2$CH$_2$CN)$_3^-$, SCN$^-$, SeCN$^-$, CuCl$_2^-$, AlCl$_4^-$, F(HF)$_{2.3}^-$.

For example, ionic liquids suitable for use as electrolytes include the following non limiting examples:

Imidazolium based cations: [MeMeIm][N(CF$_3$SO$_2$)$_2$]; [EtMeIm][BF$_4$]; [EtMeIm][C(CF$_3$SO$_2$)$_2$]; [EtMeIm][N(CF$_3$SO$_2$)$_2$]; [EtMeIm][CF$_3$CO$_2$]; [EtMeIm][CF$_3$SO$_3$]; [EtMeIm][CF$_3$CO$_2$]; [EtMeIm][N(CF$_3$SO$_2$)$_2$]; [EtMeIm][N(C$_2$F$_5$SO$_2$)$_2$]; [EtMeIm][N(CN)$_2$]; [EtEtIm][CF$_3$SO$_3$]; [EtEtIm][N(CF$_3$SO$_2$)$_2$]; [1,2-Me$_2$-3-EtIm][N(CF$_3$SO$_2$)$_2$]; [1-Et-2,3-Me$_2$Im][N(CF$_3$SO$_2$)$_2$]; [1-Et-3,5-Me$_2$Im][N(CF$_3$SO$_2$)$_2$]; [1-Et-3,5-Me$_2$Im][CF$_3$SO$_3$]; [1-Et$_2$-3,5-MeIm][N(CF$_3$SO$_2$)$_2$]; [1,2-Et$_2$-3-MeIm][N(CF$_3$SO$_2$)$_2$]; [1,3-Et$_2$-4-MeIm][N(CF$_3$SO$_2$)$_2$]; [1,3-Et$_2$-5-MeIm][N(CF$_3$SO$_2$)$_2$]; [BuMeIm][BF$_4$]; [BuMeIm][PF$_6$]; [BuMeIm][N(CF$_3$SO$_2$)$_2$]; [BuMeIm][CF$_3$SO$_3$]; [BuMeIm][C$_4$F$_9$SO$_3$]; [BuMeIm][N(CF$_3$SO$_2$)$_2$]; [iBuMeIm][N(CF$_3$SO$_2$)$_2$]; [BuEtIm][N(CF$_3$SO$_2$)$_2$]; [BuEtIm][CF$_3$CO$_2$]; [BuMeIm][C$_4$F$_9$SO$_2$]; [BuMeIm][C$_3$F$_7$CO$_2$]; [BuMeMeIm][BF$_4$]; [BuMeMeIm][PF$_6$]; [PrMeIm][BF$_4$]; [PrMeMeIm][N(CF$_3$SO$_2$)$_2$]; [iPrMeIm][N(CF$_3$SO$_2$)$_2$]; [1,2-Me$_2$-3-PrIm][N(CF$_3$SO$_2$)$_2$].

[EtMeIm][BF$_4$] is particularly preferred, and is referred to herein as EMITFB.

Pyrrolidinium based cations: [MeMePy][CF$_3$SO$_2$NCOCF$_3$]; [EtMePy][N(CN)$_2$]; [PrMePy][N(CF$_3$SO$_2$)$_2$]; [PrMePy][N(CN)$_2$]; [HexMePy][N(CN)$_2$].

Tetraalkylammonium based cations: [Me$_3$BuN][CF$_3$SO$_2$NCOCF$_3$]; [Me$_3$EtN][CF$_3$SO$_2$NCOCF$_3$]; [PrMe$_3$N][N(CF$_3$SO$_2$)$_2$]; [Et$_4$N][N(CF$_3$SO$_2$)$_2$]. [MeEt$_3$N][BF$_4$]Methyltriethylammonium tetrafluoroborate (referred to herein as MTEATFB) is also preferred.

Piperidinium based cations: [MePrPp][N(CF$_3$SO$_2$)$_2$].

Pyridinium based cations: [BuPi][BF$_4$]; [BuPi][N(CF$_3$SO$_2$)$_2$].

The conductivity of the electrolytes, as shown in table 1 substantially affect the initial ESR of the respective test cells measured at 23° C., as shown in Example 1. Electrolytes with low conductivity yielded high cell ESR, whereas high electrolyte conductivity gave lower cell ESR.

TABLE 1

Physical properties of ILs

| IL | Density (g/cm$^3$) | $T_m$(° C.) | $T_d$(° C.) | Conductivity (mS/cm) at 20° C. | Viscosity (cP) |
|---|---|---|---|---|---|
| EMITFB | 1.34 | 11 | 391 | 12.3 | 43 |
| EMITFMS | 1.38 | −10 | — | 9.3 | 34 |
| EMITFSA | 1.52 | −15 | — | 8.4 | 28 |
| EMIDCA | 1.11 | −21 | — | — | — |
| Py$_{1,3}$TFSA | 1.45 | 12 | — | 1.4 | 63 |

$T_m$ = melting point
$T_d$ = decomposition temperature of which the mass loss is ≥10%

A life test at 2.3 V and 70° C. revealed that EMITFB, and Py$_{1,3}$TFSI electrolytes in 'standard test cells' (as generally described in Example 1) using paper separator have acceptable ESR rise rates in milliohms per 1000 hours (mΩ/kHr) and capacitance loss rates in Farads per 1000 hours (F/kHr), as shown in Table 2.

TABLE 2

ESR Rise Rates & Capacitance Loss of Supercapacitor Cells at 70° C.

| Electrolyte | ESR Rise Rate at 2.3 V (mΩ/kHr) | Capacitance Loss Rate at 2.3 V (F/kHr) |
|---|---|---|
| 1M MTEATFB/PN | 14 | 0.1 |
| EMITFB Sample 1 | 4 | 0.05 |
| EMITFB Sample 2 | 7 | 0.06 |
| EMITFB Sample 3 | 6 | 0.04 |
| Py$_{1,3}$TFSI | 60 | 0.3 |
| EMITFSA | 33 | 0.1 |

The ESR rise rate and capacitance loss were also investigated at 2.75V. The capacitance loss rate remained similar (e.g. EMITFB from Sample 3 had a capacitance loss rate of 0.1 F/kHr) however the ESR rise rate at 2.75V was 31 mΩ/kHr, about five times higher than was observed at 2.3 V. Without wishing to be bound by theory one possibility for the higher ESR rise rate at 2.75V is due to impurities in the ionic liquid.

The supercapacitors of the present invention which are formed using IL's in a surface mount capable unit, such as the prismatic units mentioned, preferably have Ce's of at least 1.0 F/g at 1 ms (millisecond) and at least 3.0 F/g at 100 ms.

In one embodiment the supercapacitor has an ESR between 0.5 and 5 Ohm square centimeters (Ohm·cm$^2$) at 23 degrees Celsius, where the area is the area of positive and negative electrode overlap, and a capacitance of between about 10 and 50 Farads per cubic centimeter (F/cm$^3$) of coating at 23 degrees Celsius, where the volume of coating is the volume in the area of overlap. In a preferred embodiment the ESR is about 1 Ohm·cm$^2$ and the capacitance is about 30 F/cm$^3$. In other embodiments with a different ionic liquid electrolyte the ESR is about 4.2 Ohm·cm$^2$. In a further embodiment with another ionic liquid electrolyte the ESR is about 0.8 Ohm·cm$^2$.

The applicant has also surprisingly found that the power output over time of a supercapacitor is very highly dependent upon the purity of the ionic liquid employed as the electrolyte. Even slight changes in the purity of the ionic liquid, in the order of a few parts per million can lead to dramatic changes in ESR profile. The applicant has found that as the applicant's supercapacitors have extremely high surface areas, the impurities in the ionic liquid have a strong influence on the supercapacitors power output over time.

The applicant has found that in some, but not all cases water can be a proxy for purity in most ionic liquids. That is, if there is a lot of water present, there are usually high levels other impurities as well.

An EMITFB ionic liquid having a water content of 300 ppm was purified through an activated alumina packed column thereby reducing the water content to 160 ppm (Sample 3). A second sample of EMITFB was independently obtained from a commercial source which contained a water content of 50 ppm (Sample 2). 15 standard test cells were made using 6 μm coating as the electrodes. The test cells were dried for 16 h at 75° C. Following drying, five cells were filled with Sample 1, five with Sample 2 and five with 1 M MTEATFB/PN, as the control.

The cells were tested for initial ESR and capacitance at room temperature, as shown in Table 3.

TABLE 3

Initial ESR and capacitance of standard cell containing ionic liquid at room temperature

| Cell type | Initial | |
|---|---|---|
| | ESR (mΩ) | Capacitance (F) |
| EMITFB (160 ppm H$_2$O) [Sample 1] | 45 ± 1 | 0.666 ± 0.006 |
| EMITFB (50 ppm H$_2$O) [Sample 2] | 44.6 ± 0.8 | 0.673 ± 0.009 |
| 1M MTEABF$_4$/PN (18 ppm H$_2$O) [control] | 31.9 ± 0.4 | 0.681 ± 0.009 |

ESR data obtained across a test temperature range from −10° C. to 70° C. revealed EMITFB filled cells were very stable under an applied voltage of 2.3 V. Both Sample 1 and 2 showed noticeably reduced ESR rise rate compared with 1 M MTEATFB/PN when tested at 70° C. and 2.3 V, as shown in Table 2. Cells filled with sample 1 showed a lower rise rate in ESR than cells filled with sample 2. Without wishing to be bound by theory it is believed that by purifying sample 1 through an activated alumina column, impurities as well as water were removed from the ionic liquid, which resulted in less electroactive species in the electrolyte hence a lower rise rate.

Life test data showed noticeably higher average ESR rise rates for cells made from sample 2 (7 mΩ/kHr) than from sample 1 (4 mΩ/kHr) when tested at 2.3 V and 70° C., however there was no significant difference in capacitance between cells made from sample 1 and sample 2. This suggests that there may be higher levels of impurities apart from water in sample 2 than in sample 1, and that these react with the electronic pathway of the electrode.

Very surprisingly tests also revealed that cells containing ionic liquids were able to function at temperatures well below the freezing point of the IL. Cells with EMITFB as the electrolyte were still functional at as low as −15° C., which is well below the melting point of the ionic liquid (11° C.). Without wishing to be bound by theory, when the IL is cooled below its melting point in a supercapacitor, the IL exhibits properties of a supercooled fluid. That is, the ionic liquid appears to retain liquid character, or the essential characteristics of a liquid, below its melting point until the glass temperature is reached. One possible reason for this may be due to the high geometric area and/or internal roughness of the supercapacitor. Another is that small particles of alumina may be present in the electrolyte after the purification step disclosed here.

Surprisingly, it has been found that solvents may be used in conjunction with ionic liquids to provide electrolytes which have improved conductivities over the ionic liquids alone, but do not exhibit vapour pressures at elevated temperatures (for example, around 260° C.) that are significantly above those of the ionic liquid.

The conductivity and vapour pressure of some ionic liquid/solvent electrolytes at a range of concentrations were measured at 260° C. which is considered to be representative of the high end of the temperatures expected to be encountered either in-use or during SMT fabrication. The solvents chosen were from the broad classes of carbonates (in this case propylene carbonate), lactones (in this case γ-butyrolactone) or nitriles (in this case glutaronitrile). The solvent is preferably present in an amount of around less than 50 wt % of the electrolyte, and more preferably in an amount of around 20-40 mol % of the electrolyte.

The results are shown in FIGS. 8-10.

Figure 8A:
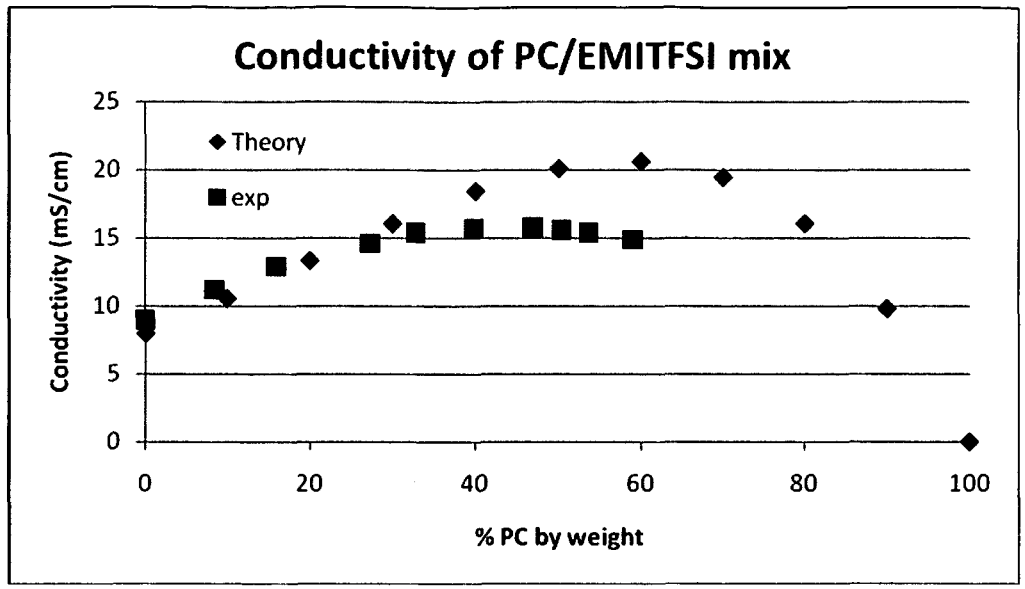
FIG. 8 shows the relationship between PC concentration and vapour pressure/conductivity for EMITSFI/PC mixtures.
Figure 8B:
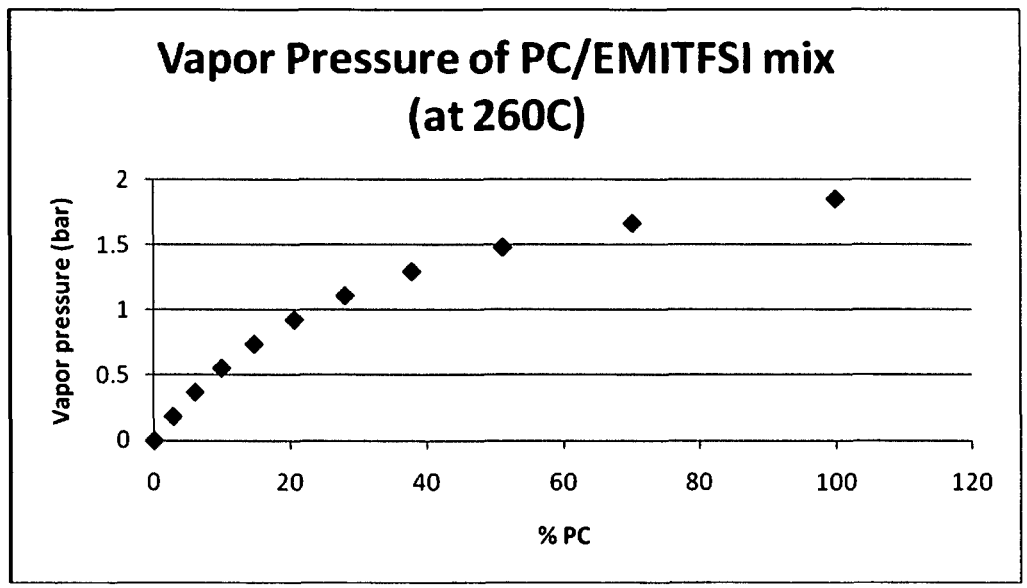

FIG. 8a shows that increasing the concentration of propylene carbonate to around 40% leads to a peak conductivity of around 15 mS/cm at room temperature. The vapour pressure of the mixture is shown in FIG. 8b to be around 1.5 bar at 260 degC for the same optimal concentration. Depending upon the operational requirement, a suitable compromise between increased conductivity and increased vapour pressure can be selected.

Figure 9A:
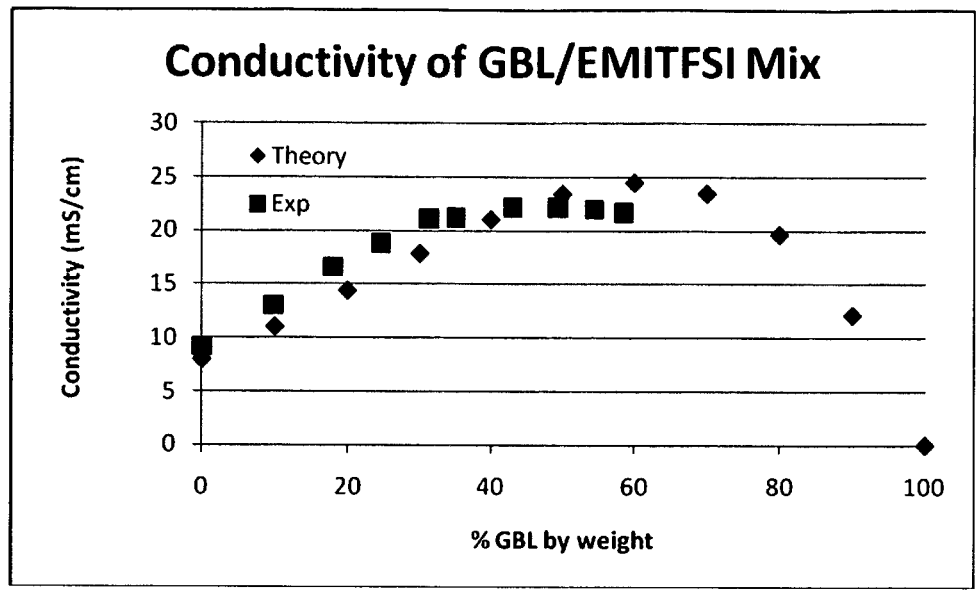
FIG. 9 shows the relationship between GBL concentration and vapour pressure/conductivity for EMITSFI/GBL mixtures.
Figure 9B:
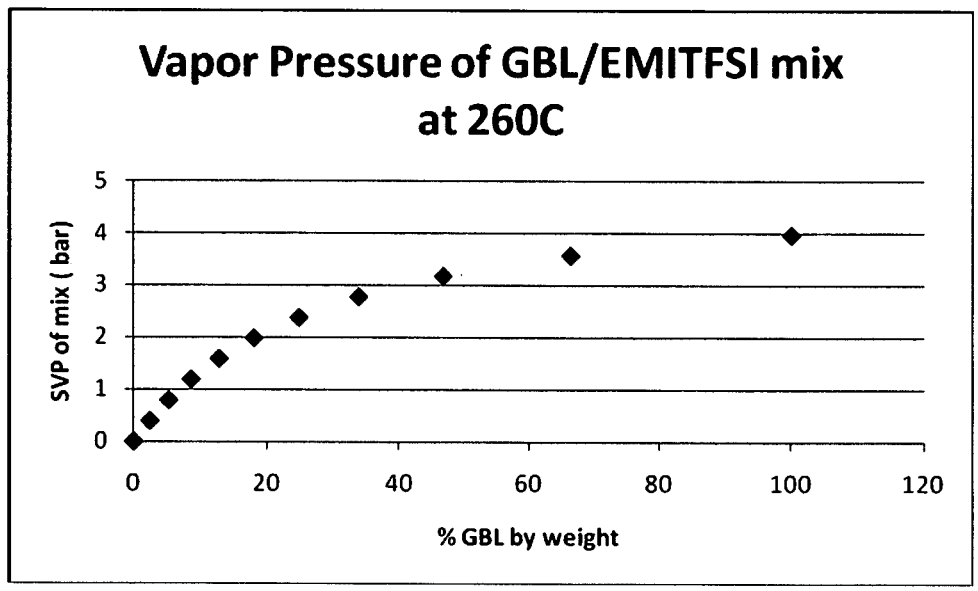

FIGS. 9a and 9b show a similar trade off for γ-butyrolactone EMITSFI mixtures.

Figure 10A:
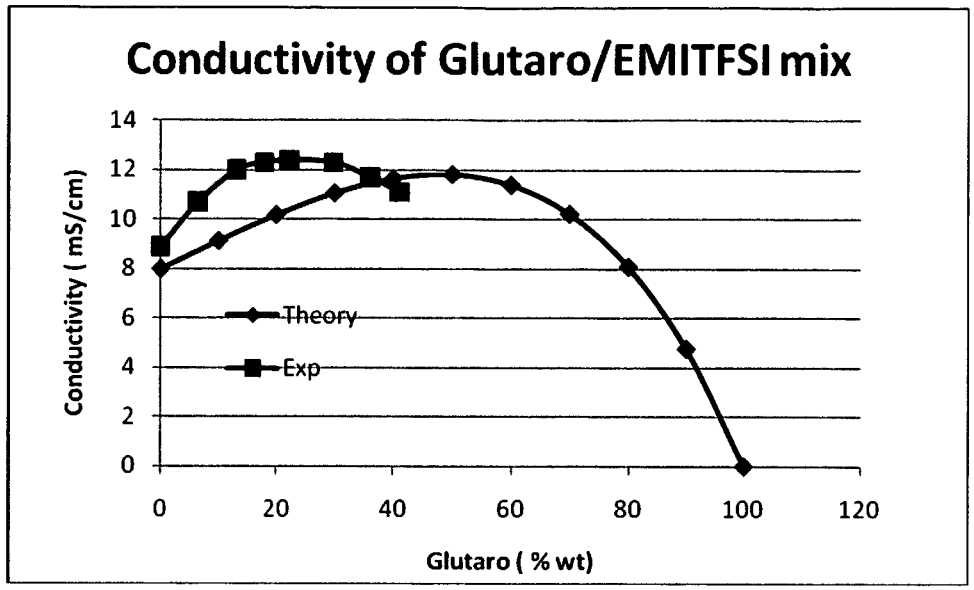
FIG. 10 shows the relationship between glutarontrile concentration and vapour pressure/conductivity for EMITSFI/glutaronitrile mixtures.
Figure 10B:
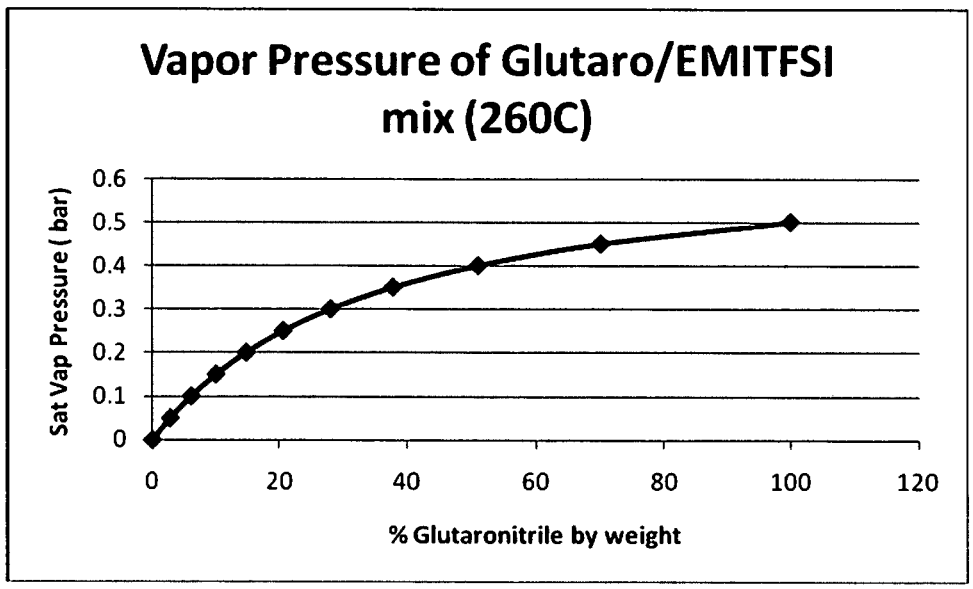

FIGS. 10a and 10b perhaps show the most striking results, using glutaronitrile as a solvent for EMITSFI. An optimal increase in conductivity of around 50%, from 9 mS/cm for neat EMITSFI to 13 mS/cm, is achieved at around 20 wt % glutaronitrile concentration. A concomitant increase in vapour pressure, from around zero to about 0.25 bar can be seen for the same concentration. Thus, for the cost of only a small vapour overpressure, a significant rise in conductivity can be achieved.

Figure 11:
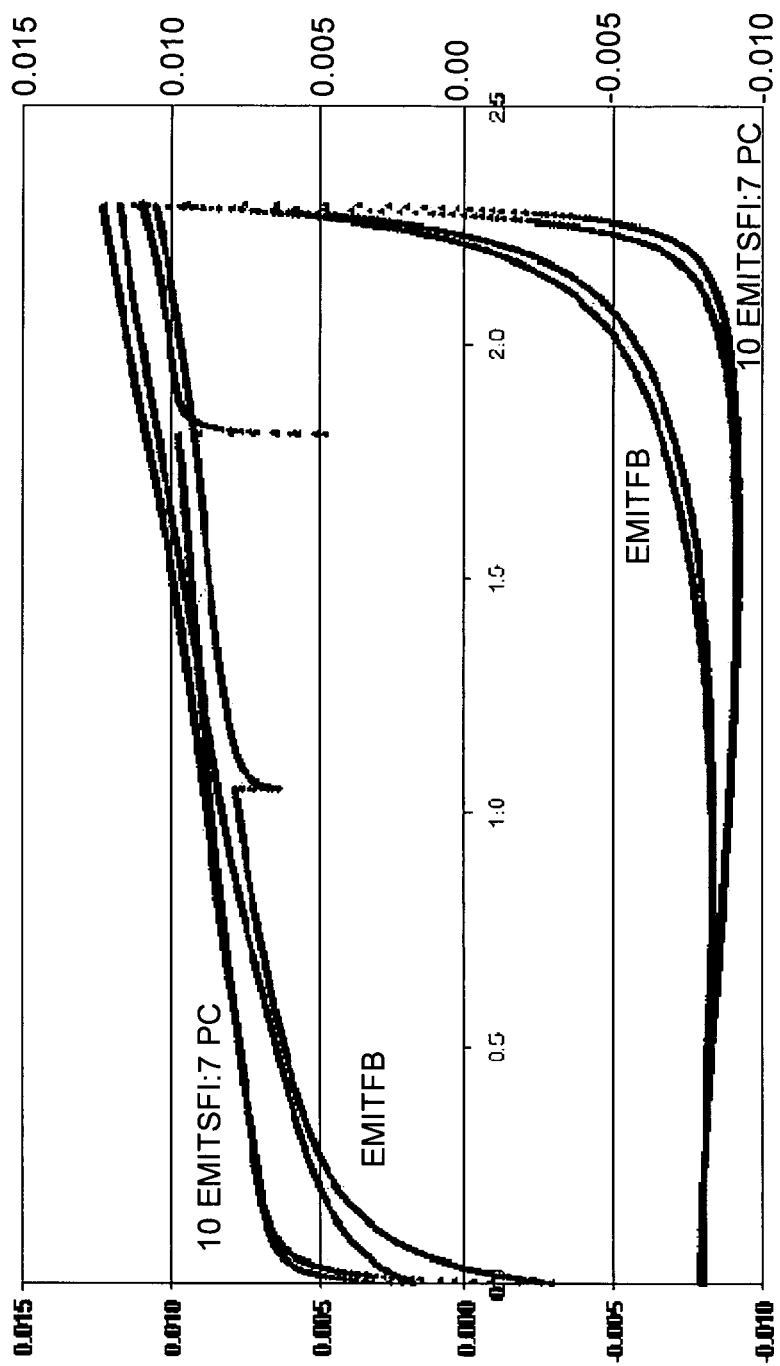
FIG. 11 is shows CV's for EMITFSI:PC (10:7) compared with neat EMITFB

Another important aspect of forming a blended electrolyte comprising an ionic liquid and a solvent is the resultant improvement observed in terms of the frequency response of the cell and the superior capacitance over a broad range. That is, mixing a solvent such as PC, GN or GBL with an ionic liquid such as EMITFSI increases the speed of cell discharge compared to the corresponding neat IL. FIG. 11 shows a CV of cells having EMITFSI:PC (10:7) compared with an otherwise identical cell containing EMITFB, which is nearly identical in CV profile to neat EMITSFI. The CV of the blended liquid is considerably squarer than for the neat ionic liquid.

As mentioned above, it is also believed that IL: solvent mixes have lower chemical reactivity with the CMC binder. EMITSFI:PC mixes are thus highly compatible with the coating, especially it is believed coatings comprising CMC as a binder.

Example 1

Forming a Supercapacitor

Electrode sheets formed from 6 μm thick carbon coatings on 22 μm thick aluminium foil were cut to give 29 cm$^2$ of active area and one separator selected from: a 25 μm thick paper separator; a 35 μm thick nylon separator or; a 37 μm thick polypropylene separator was placed between the electrodes. The whole was then folded in half to form a flat electrode stack with bare aluminium tabs extending. The whole was saturated with either: 1M TEATFB/PC; EMITFB; EMITFSI; Py$_{1,3}$TFSI; EMITFMS or; EMIDCA electrolyte and sealed into a package formed from a polypropylene and aluminium laminate with an EAA sealant layer. The supercapacitor thus assembled had external dimensions of about 60×55×0.4 mm. This general construction is used a standard for materials comparison. Electrical testing results are given in Table 4 and the effect of temperature is given in Table 5 for a like series of samples.

TABLE 4

Electrical properties of cells with ionic liquids

| Electrolyte | Separator | ESR at 2.3 V ($\Omega \cdot cm^2$) | Capacitance at 0.2 A discharge (F/cm$^3$) |
|---|---|---|---|
| 1M TEATFB/PC | Polypropylene | 1.54 | 41 |
| EMITFB | Paper | 1.30 | 31 |
| EMITFB | Nylon | 1.03 | 33 |
| EMITFB | Polyimide1 | 1.50 | 42 |
| EMITFB | Polyimide2 | 1.72 | 44 |
| EMITFSI | Paper | 1.59 | 32 |
| Py$_{1,3}$TFSI | Paper | 4.25 | 17 |
| EMITFMS | Paper | 1.67 | 30 |
| EMIDCA | Paper | 0.85 | 37 |

[NOTE:
The two polyimide separators have different porosities and thicknesses]

TABLE 5

Temperature dependence of ESR (mΩ)

| Temperature (° C.) | EMITFB with paper separator | EMITFMS with paper separator | EMITFSI with paper separator | EMITFB with nylon separator |
|---|---|---|---|---|
| 90 | 20.8 | — | — | — |
| 80 | 23.6 | — | — | — |
| 70 | 28.4 | 32.8 | 38.2 | — |
| 60 | 32.2 | 37.3 | 40.2 | — |
| 50 | 35.6 | 42.9 | 41 | — |
| 40 | 40.5 | 47.4 | 45.1 | — |
| 30 | 42.2 | 52.3 | 52.9 | — |
| 25 | 44.0 | 54.5 | 59.2 | — |
| 20 | 55.4 | 58.8 | 66.8 | 41.7 |
| 15 | 63.2 | — | — | — |
| 10 | 72.9 | 81.0 | 92.7 | 51.7 |
| 5 | 86.0 | — | — | — |
| 0 | 111 | 117 | 137 | 72.8 |
| −5 | 132 | — | — | — |
| −10 | 159 | 182 | 223 | 122 |
| −15 | 219 | 235 | 298 | 152 |
| −20 | 309 | 2300 | 1700 | 212 |

Example 2

Forming a Supercapacitor and SMT Testing

Electrode sheets formed from 6 μm thick carbon coatings on 22 μm thick aluminium foil were layered with a 25 μm thick paper separator to form a flat electrode stack of maximum dimensions about 30×15×1 mm. Aluminium tabs (5 mm wide by 100 μm thick) with pre-coated polypropylene sealant layers were attached to opposing ends of the electrode stack. The whole was saturated with EMITFB electrolyte and sealed within a polypropylene and aluminium laminate package designed for packaging lithium-ion batteries. The supercapacitor thus assembled has external dimensions of about 39×17×1.3 mm and the terminals extend about 1.5 cm. The supercapacitor was then approximately evenly coated with a layer of silicone sealant to give an approximately 50×28×15 mm device with the aluminium tabs extending about 5 mm beyond the silicone. After curing overnight, the supercapacitor was heated from room temperature to about 50° C. over about 8 minutes and then to 230° C. within 2 minutes held at 230° C. for two minutes and then air quenched back to room temperature. Electrical testing showed that after the SMT exposure the ESR has increased from 50 mΩ to about 115 mΩ and the capacitance has decreased from about 0.55 F to about 0.50 F.

Example 3

Forming a Supercapacitor and SMT Testing

Electrode sheets formed from 6 μm thick carbon coatings on 22 μm thick aluminium foil were layered with a 25 μm thick paper separator to form a flat electrode stack of maximum dimensions about 30×15×1 mm. Aluminium tabs (3 mm wide by 100 μm thick and about 10 cm long) with pre-coated polypropylene sealant layers were attached to opposing ends of the electrode stack. The whole was saturated with EMITFSI electrolyte and sealed within a polypropylene and aluminium laminate package designed for packaging lithium-ion batteries. The supercapacitor thus assembled has external dimensions of about 39×17×1.3 mm and the terminals extend approximately 10 cm. This supercapacitor cell was then placed within a housing machined from a 49×22×4 mm block of Teflon with a 45×18×2 mm cavity. The terminals were folded to maximise the thermal pathway through them, extending about 7 mm from the housing. The remaining space within the cavity was then filled with Araldite LC191/LC177 epoxy, a Teflon lid (49×22×2 mm) was clamped on and the epoxy cured at 65° C. for one hour. The housing was then coated with an approximately 3 mm thick layer of silicone and allowed to cure overnight. The supercapacitor thus assembled was from room temperature to about 50° C. over about 8 minutes and then to 230° C. within 2 minutes, held at 230° C. for two minutes and then air quenched back to room temperature. Electrical testing showed that after the SMT exposure the ESR has increased from 79 mΩ to about 87 mΩ and the capacitance had not substantially changed.

Example 4

Forming a Supercapacitor and SMT Testing

Electrode sheets formed from 15 μm thick carbon coatings on 22 μm thick aluminium foil were layered with a 35 μm thick nylon separator to form a flat electrode stack of maximum dimensions about 30×15×1 mm. Aluminium tabs (3 mm wide by 100 μm thick) with pre-coated polypropylene sealant layers were attached to opposing ends of the electrode stack. The whole was saturated with EMITFSI electrolyte and sealed within a polypropylene and aluminium laminate package designed for packaging lithium-ion batteries. The supercapacitor thus assembled has external dimensions of about 39×17×1.3 mm. This supercapacitor cell was then placed within an approximately 50×21×4 mm housing formed from a single folded sheet of Nomex. The terminals extended about 4 mm from the housing. The remaining space within the cavity was filled with Araldite LC191/LC177 epoxy, the housing was closed by folding a lid, also formed from the single sheet of Nomex, clamped, and the epoxy cured at 65° C. for one hour. In some instances air was trapped within the housing. This housing was then wrapped in a single layer of 60 μm thick Kapton tape. The supercapacitor thus assembled was from room temperature to about 50° C. over about 8 minutes and then to 230° C. within 2 minutes, held at 230° C. for two minutes and then air quenched back to room temperature. Electrical testing showed that after the SMT exposure the ESR has increased by about 20% from 73 mΩ and the capacitance was substantially unchanged at 1.2 F.

Example 5

Forming a Supercapacitor and SMT Testing

A series of supercapacitors for SMT applications using EMITFSI as electrolyte were prepared and the results obtained are shown in table 6.

The cells in devices C1-D6 were constructed with positive and negative terminals at 90° angle to each other (however 180° opposed terminals work equally well). A stack of 16 electrode layers (8 μm carbon coating with CMC binder on both sides) with an area 15 mm×15 mm was formed. A PTFE-based separator was used to separate positive electrodes from negative. The cells were dried at 75° C. for 16 hours and then EMITFSI was added as the electrolyte and the cells were sealed in hermetic packaging. The final single cell size was approximately 20 mm×20 mm×1.2 mm.

The cells were then used to prepare single or dual cell devices as indicated in table 6. Dual cell devices were prepared by ultrasonically welding positive and negative terminals of two cells together to give a series connection.

The cells in device B9 were constructed slightly differently. Positive and negative terminals were at 90° angle to each other. A stack of 12 electrode layers (14 μm carbon coating with CMC binder on both sides) with an area 15 mm×15 mm was formed. A PTFE-based separator was used to separate positive electrodes from negative. The cells were dried at 75° C. for 16 hours and then a mixture of EMITSFI and the solvent propylene carbonate (PC) in a 10:7 mass ratio was added as the electrolyte and the cells were sealed in hermetic packaging. The final single cell size was approximately 20 mm×20 mm×1.0 mm.

Dual cell devices were 5.5V devices and single dell devices were 2.75V devices.

The positive and negative terminals of two cells were welded together to form dual cell device B9.

Once the devices in table 6 were prepared, they were packaged in LCP boxes with external dimension of approximately 22×22×5 mm. The void space remaining in the boxes was filled with thermally insulating material External copper terminal extensions were welded on to the device terminals and lead-free solder paste was placed on the terminals prior to SMT treatment.

The ESR, capacitance and electrical performance of the supercapacitor device was determined. The supercapacitor device was subjected to SMT conditions as per FIG. 12 and the ESR, capacitance and electrical performance was remeasured. The results are shown in table 6

Thin thermocouples were placed inside device C5 on the laminate of both top and bottom cells and at the external terminal of device C8.

Devices, C5, C6 & C8 were allowed to cool for 15 minutes after the exposure to initial SMT conditions and put through a second SMT cycle.

Figure 12:
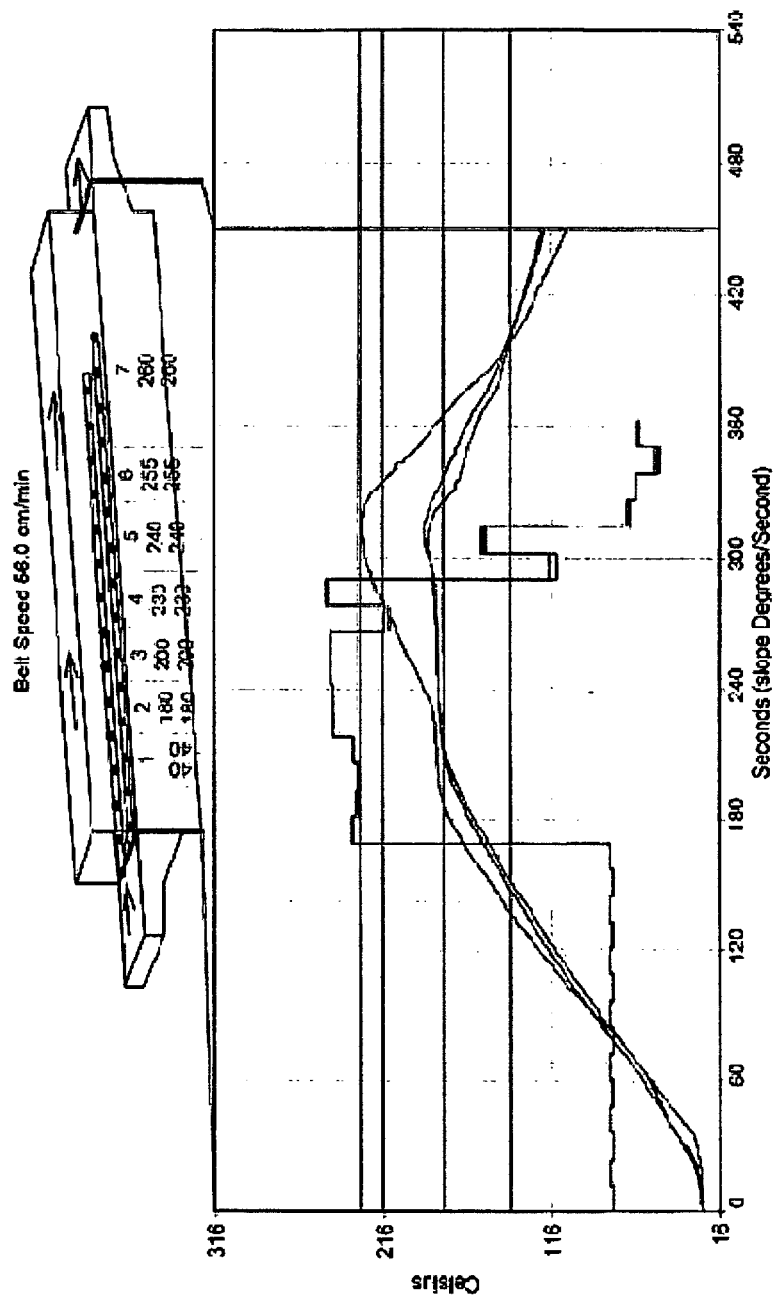
FIG. 12 shows the SMT profile applied to devices of the present invention.

The SMT profile employed is shown in FIG. 12. The internal and external temperatures as measured by the thermocouples are shown. Where a device was re-subjected to further SMT treatment, the second thermal profile was very similar to the first. The peak internal temperature was around 190° C. The entire device experienced temperatures of at least around 180° C. for in excess of 90 seconds.

The resultant ESR and Capacitance data are shown in the attached table.

| Device # | Construction | ESR mΩ Pre-SMT | ESR mΩ Post-SMT | CAPACITANCE (F) Pre-SMT | CAPACITANCE (F) Post-SMT |
|---|---|---|---|---|---|
| C1 | Dual Cell | 101.8 | 106.8 | 0.386 | 0.420 |
| C3 | Dual Cell | 100 | 116.3 | 0.407 | 0.403 |
| C4 | Dual Cell | 107.9 | NA | 0.390 | NA |
| C5 | Dual Cell | 110.0 | 115.9 | 0.369 | 0.370 |
| C6 | Single Cell | 57.8 | 60.3 | 0.789 | 0.782 |
| C7 | Single Cell | 51.3 | 61.5 | 0.808 | 0.777 |
| C8 | Single Cell | 52.8 | 60.4 | 0.826 | 0.812 |
| C9 | Single Cell | 55.9 | 61.7 | 0.809 | 0.836 |
| D2 | Dual Cell | 100.9 | 118.6 | 0.423 | 0.402 |
| D3 | Dual Cell | 102.1 | 119.3 | 0.442 | 0.400 |
| D8 | Dual Cell | 99.8 | 119.6 | 0.452 | 0.407 |
| D5 | Single Cell | 55.1 | 66.9 | 0.882 | 1.037 |
| D6 | Single Cell | 55.8 | 67.9 | 0.882 | 0.898 |
| B9 | Dual Cell | 118.0 | 146.3 | 0.452 | 0.416 |

The ESR for dual cell devices was measured at 5.5V bias. The ESR for single cell devices was measured at 2.75V bias. Capacitance was measured at 0.2 A discharge rates.

A few capacitors were selected for EIS analysis. Results showed that the exposure to SMT oven temperature enhanced the frequency response of the capacitor.

In general, it was found that the coating of the electrode, i.e. the carbon coating and CMC binder, and the ionic liquid electrolytes, particularly EMITSFI, survived SMT conditions very well. Capacitance and ESR values before and after SMT are generally unchanged, and if anything, improved by SMT treatment, especially neat EMITSFI.

Although the invention has been described with reference to specific examples, it will be appreciated by those skilled in the art that the invention may be embodied in many other forms. In particular, features of any one of the various The claims defining the invention are as follows:

1. A supercapacitor comprising:
   at least one pair of electrodes having a mixture of carbon particles on facing surfaces of the at least one pair of electrodes;
   a porous separator positioned between the facing surfaces of the at least one pair of electrodes; and
   an electrolyte for wetting the separator wherein the electrolyte comprises an ionic liquid and a solvent; wherein the solvent is selected and provided in an amount such that, at a predetermined temperature: i) the conductivity of the solvent/ionic liquid mixture is higher than the conductivity of the ionic liquid alone; and ii) the vapor pressure of the solvent/ionic liquid mixture is not significantly higher than the vapor pressure of the ionic liquid alone,
   the solvent is present in an amount of 20-40 wt % of the electrolyte, and
   the solvent/ionic liquid mixture is one of propylene carbonate/1-ethyl-3-methylimidazolium-bis(trifluoromethyl-sulfnyl)imide (PC/EMITSFI),
   γ-butyrolactone/1-ethyl-3-methylimidazolium-bis(trifluoromethyl-sulfnyl)imide (GBUEMITSFI), and
   gutaronitrile/1-ethyl-3-methylimidazolium-bis(trifluoromethyl-sulfnyl)imide (GLUTARO/EMITSFI).

2. A supercapacitor according to claim 1 wherein the solvent is selected and provided in an amount such that:
   i) at about room temperature or below the conductivity of the solvent/ionic liquid mixture is higher than the conductivity of the ionic liquid alone; and
   ii) at about solder reflow temperature or below the vapor pressure of the solvent/ionic liquid mixture is not significantly higher than the vapor pressure of the ionic liquid alone.

3. A supercapacitor according to claim 1 wherein the ionic liquid remains ionically conductive at or below −10° C.

4. A supercapacitor according to claim 1 wherein the ionic liquid has a decomposition point greater than or equal to 260° C.

5. A supercapacitor according to claim 1 wherein the ionic liquid does not cause decomposition of the electrode at external temperatures equal to 260° C.

6. A supercapacitor according to claim 1 wherein the electrode contains aluminum foil.

7. A supercapacitor according to claim 1 wherein the mixture of carbon particles comprises carbon having a surface area of at least 400 $m^2$ per gram.

8. A supercapacitor according to claim 1 wherein the mixture of carbon particles is in the form of a coating between 1 and 500 microns thick.

9. A supercapacitor according to claim 1 wherein the mixture of carbon articles comprises a binder is selected from the group consisting of cellulosic materials, rubbers and fluorinated resins.

10. A supercapacitor according to claim 9 wherein the binder is carboxymethylcellulose (CMC) in sodium (NaCMC) and/or protonated (HCMC) form.

11. A supercapacitor according to claim 1 wherein the mixture of carbon particles is about 20 microns thick and contains about 65% activated carbon, about 25% conductive carbon, and about 10% of binder.

12. A supercapacitor according to claim 1 that has a maximum operating voltage of between 2.3 and 2.75 V.

13. A supercapacitor according to claim 1 having an ESR between 0.5 and 5 Ohm square centimeters (Ohm·$cm^2$) at 23 degrees Celsius.

14. A supercapacitor according to claim 1 having an ESR of between about 4.2 Ohm·$cm^2$ to about 0.8 Ohm·$cm^2$.

15. A supercapacitor according to claim 1 with a Ce of at least 1.0 F/g at 1 ms.

16. A supercapacitor according to claim 1 with a Ce of at least 3.0 F/g at 100 ms.

17. A supercapacitor according to claim 1 with a Ce of at least 1.0 F/g at 1ms and a Ce of at least 3.0 F/g at 100 ms.

18. A supercapacitor according to claim 1 having an ESR rise rate at 2.3V of <60 mΩ/kHr at 70° C.

19. A supercapacitor according to claim 1 having an ESR rise rate at 2.3V of between 10 and 20 mΩ/kHr at 70° C.

20. A supercapacitor according to claim 1 having an ESR rise rate at 2.3V of <10 mΩ/kHr at 70° C.

21. A supercapacitor according to claim 1 having a capacitance loss rate at 2.3V of $<3\times10^{-4}$ F/Hr at 70° C.

22. A supercapacitor according to claim 1 having a capacitance loss rate at 2.3V of $<1\times10^{-4}$ F/kHr at 70° C.

23. A supercapacitor according to claim 1 having a capacitance loss rate at 2.3V of about $5\times10^{-5}$ F/kHr at 70° C.

24. A supercapacitor according to claim 1 formed with an ionic liquid in a surface mount capable unit.

25. A supercapacitor according to claim 1 wherein the solvent/ionic liquid mixture is PC/EMITSFI.

26. A supercapacitor according to claim 1 wherein the solvent/ionic liquid mixture is GBL/EMITSFI.

27. A supercapacitor according to claim 1 wherein the solvent/ionic liquid mixture is GLUTARO/EMITFSI.

* * * * *